(12) United States Patent
Minami et al.

(10) Patent No.: US 6,417,321 B1
(45) Date of Patent: *Jul. 9, 2002

(54) CURED FLUORENYL POLYIMIDES

(75) Inventors: Kazuhiko Minami; Hiroshi Ayukawa; Toshihiro Suwa, all of Sagamihara; Mitsuaki Kobayashi, Hino, all of (JP); Bert T. Chien, Minneapolis; Stephen A. Ezzell, Woodbury, both of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/642,724

(22) Filed: Aug. 21, 2000

(51) Int. Cl.⁷ .................. C08G 73/10; G02F 1/1335; B01D 71/64
(52) U.S. Cl. .................. 528/353; 528/125; 528/128; 528/170; 528/172; 528/173; 528/176; 528/183; 528/185; 528/220; 528/229; 428/1.1; 428/1.26; 428/473.5; 428/901; 385/129; 385/130; 385/141; 385/145; 343/700 R; 343/785; 343/911 R
(58) Field of Search ................ 528/125, 128, 528/170, 353, 229, 220, 172, 173, 176, 183, 185, 350; 343/700 R, 785, 911 R; 385/129, 130, 141, 145; 428/901, 1.1, 1.26, 473.5

(56) References Cited

U.S. PATENT DOCUMENTS

| | | | |
|---|---|---|---|
| 3,758,434 A | 9/1973 | Kunzel et al. | 528/353 |
| 4,845,185 A | 7/1989 | Teramoto et al. | 528/229 |
| 5,145,937 A | 9/1992 | Hergenrother et al. | 528/125 |
| 5,145,942 A | 9/1992 | Hergenrother et al. | 528/353 |
| 5,386,002 A | 1/1995 | Inbasekaran et al. | 528/170 |
| 5,750,641 A | 5/1998 | Ezzell et al. | 528/170 |
| 5,969,088 A | 10/1999 | Ezzell et al. | 528/353 |
| 6,074,709 A | 6/2000 | Ezzell et al. | 428/1.3 |
| 6,084,053 A | 7/2000 | Matsubara et al. | 528/170 |

FOREIGN PATENT DOCUMENTS

| | | | |
|---|---|---|---|
| EP | 0242815 A2 | * | 10/1987 |
| JP | 5-31341 | * | 9/1993 |

OTHER PUBLICATIONS

Derwent–Acc–No: 1968–11052Q, Polyamides and Polyimides based on 9,9–bis 4–amino phenyl fluorenyl, Korshak, V.V., (Inst. of Heteroorganic Sys.), –SU198644A, 1968.*

\* cited by examiner

*Primary Examiner*—P. Hampton-Hightower
(74) *Attorney, Agent, or Firm*—Philip Y. Dahl

(57) ABSTRACT

A thermally cured polyimide is provided, and in particular a crosslinked polyimide, comprising a fluorenyl diamine and comprising an aromatic ring having at least one C1–C10 branched or unbranched alkyl substituent, where the alkyl substituent includes a benzylic hydrogen. The present invention provides a crosslinked polyimide made by a process comprising the step of crosslinking a polyimide comprising diamines comprising pendent fluorenyl groups and comprising aromatic rings having at least one C1–C10 branched or unbranched alkyl substituent, the alkyl substituent including a benzylic hydrogen, by raising the temperature of said polyimide above its glass transition temperature.

67 Claims, 4 Drawing Sheets

CURED FLUORENYL POLYIMIDES

FIELD OF THE INVENTION

This invention relates to cured polyimides, and in particular crosslinked polyimides, derived from diamines comprising pendent fluorenyl groups, and comprising an aromatic ring having at least one C1–C10 branched or unbranched alkyl substituent, wherein said alkyl substituent includes a benzylic hydrogen.

BACKGROUND

U.S. Pat. No. 5,386,002 describes alkyl-substituted fluorenyl diamine-derived polyimides as thermoplastics, specifically defined therein as having the characteristic that they do not crosslink. (col. 6, lns. 1–5).

U.S. Pat. No. 3,758,434 teaches that a fluorenyl imide without alkyl substituents is soluble in "hot dimethyl formamide" after heating to 280° C. for 45 min. (Example 4, col. 8, lns. 28–44).

U.S. Pat. Nos. 5,750,641 and 5,969,088 describe polyimides comprising pendent fluorenyl groups and their use as an angularity enhancement layer in a liquid crystal display or as a dielectric layer in an electrical device.

U.S. Pat. No. 6,084,053 describes electronic parts made with fluorenyl polyimides. The '053 reference does not teach that polyimides may be crosslinked and does not draw distinctions in that regard between alkyl-substituted fluorenyl diamine derived polyimides and others.

U.S. Pat. No. 5,145,942 describes crosslinking of polyimides containing methyl-substituted aromatic rings joined by carbonyl and ether groups. The '942 reference nowhere describes a polyimide derived from a fluorenyl diamine.

SUMMARY OF THE INVENTION

Briefly, the present invention provides a cured polyimide comprising diamines comprising pendent fluorenyl groups and comprising aromatic rings having at least one C1–C10 branched or unbranched alkyl substituent, wherein said alkyl substituent includes a benzylic hydrogen. Preferably the alkyl subtitutent is methyl or ethyl, more preferably methyl. Preferably the fluorenyl diamine excludes ether linkages and more preferably excludes both ether and carbonyl-containing linkages.

In another aspect, the present invention provides a cured polyimide made by a process comprising the step of curing diamines comprising pendent fluorenyl groups and comprising aromatic rings having at least one C1–C10 branched or unbranched alkyl substituent, wherein said alkyl substituent includes a benzylic hydrogen. Preferably the step of curing is accomplished by thermal curing, preferably by raising the temperature of said polyimide to a temperature greater than 300° C.

In another aspect, the present invention provides a crosslinked polyimide comprising diamines comprising pendent fluorenyl groups and comprising aromatic rings having at least one C1–C10 branched or unbranched alkyl substituent, wherein said alkyl substituent includes a benzylic hydrogen. Preferably the alkyl subtitutent is methyl or ethyl, more preferably methyl. Preferably the fluorenyl diamine excludes ether linkages and more preferably excludes both ether and carbonyl-containing linkages.

In another aspect, the present invention provides a crosslinked polyimide made by a process comprising the step of crosslinking diamines comprising pendent fluorenyl groups and comprising aromatic rings having at least one C1–C10 branched or unbranched alkyl substituent, wherein said alkyl substituent includes a benzylic hydrogen. Preferably the step of crosslinking is accomplished by thermal curing, preferably by raising the temperature of said polyimide to a temperature greater than the Tg of the polyimide.

What has not been described in the art, and is provided by the present invention, is curing or crosslinking of a polyimide containing diamines comprising pendent fluorenyl groups.

In this application:

"cured" describes a thermally treated polymer having less solubility at a given temperature than the same polymer prior to treatment, preferably measured in regard to solvents methyl ethyl ketone, N-methylpyrrolidone or γ-butyrolactone and preferably at room temperature;

"crosslinked" describes a polymer having a network structure, typically demonstrated by insolublility even at elevated temperatures and for extended times;

"benzylic hydrogen" refers to a hydrogen atom attached to a carbon atom directly attached to an aromatic ring, e.g., any of the three methyl hydrogens of toluene, any of the two alpha hydrogens of ethyl benzene, etc.;

"polyimide" refers to a polyimide polymer unless indicated otherwise;

"a polyimide comprising a diamine" and like phrases should be understood to refer to polyimide polymers incorporating segments derived from the indicated diamine monomers, as by a polymerization including said monomers;

"diamines comprising pendent fluorenyl groups" refers to fluorenyl compounds disubstituted at the 9 position with amine-containing substituents, such as 9,9-bis (aminoaryl)fluorenes;

"polyimides comprising pendent fluorenyl groups" refers to polyimides derived at least in part from pendent-fluorenyl diamine monomers;

"C(number)" refers to a chemical moiety containing the indicated number of carbon atoms; and the term "substituted" used without reference to a particular substituent means, for a chemical species, substituted by conventional substituents which do not interfere with the desired product or process, e.g., substituents can be alkyl, alkoxy, aryl, phenyl, halo (F, Cl, Br, I), cyano, etc.

It is an advantage of the present invention to provide a material having the optical and electrical characteristics of pendent-fluorenyl polyimides in a crosslinked and insoluble form. It is an added advantage to provide a method of casting a polyimide comprising pendant fluorenyl groups, e.g. as a film, and thereafter rendering it insoluble.

DETAILED DESCRIPTION OF PREFERRED EMBODIMENTS

Figure 1:
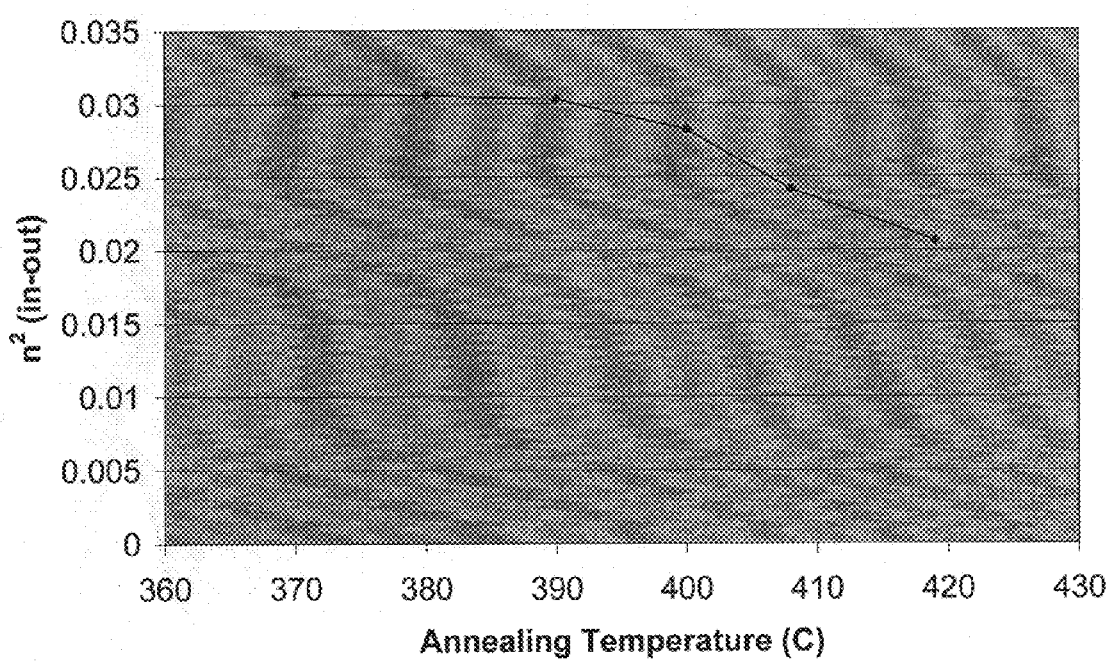
FIG. 1 is graph of curing temperature vs. measured birefringence for a sample of polyimide according to the present invention.

The present invention provides cured or crosslinked polyimides comprising diamines comprising pendent fluorenyl groups and comprising aromatic rings having at least one C1–C10 branched or unbranched alkyl substituent, wherein said alkyl substituent includes a benzylic hydrogen.

At least one diamine of the polyimide according to the present invention contains a pendent fluorenyl group, preferably a 9,9-substituted fluorenyl group and more preferably a substituted or unsubstituted 9,9-bis(aminoaryl)fluorene. Preferably the fluorenyl diamine contains no ether groups. More preferably the fluorenyl diamine contains no ether or carboxyl-containing groups, such as keto or ester groups. Most preferably the fluorenyl diamine is 9,9-bis(3-methyl-4-aminophenyl)fluorene (OTBAF), which may be additionally substituted but preferably is not.

Aminoaryl groups of 9,9-bis(aminoaryl)fluorenes refers to groups comprising aromatic rings bearing at least one primary amine group. Aromatic groups can be monocyclic or polycyclic and can have from 6 to about 40 carbon atoms. Preferably, the aromatic groups are monocyclic, more preferably phenyl, and are attached to the fluorene nucleus at aromatic ring positions para to the primary amine group. Either or both of the aminoaryl rings may be substituted with from 0 to 4 linear, branched or cyclic alkyl groups, halogen, or phenyl. Preferably, both rings may be substituted with 1 or 2 linear or branched alkyl groups having from 1 to 3 carbon atoms, such substitution being at any of ring positions 2, 3, 5, or 6, preferably at ring positions 3 or 5 or a combination thereof. More preferably, both aminoaryl rings can be substituted with 1 or 2 methyl or ethyl groups. Most preferably, 9,9-bis(aminoaryl)fluorenes useful in the invention include 9,9-bis(toluidinyl)fluorenes including 9,9-bis(3-methyl-4-aminophenyl)fluorene, 9,9-bis(3,5-dimethyl-4-aminophenyl)fluorene, 9,9-bis(3,5-diethyl-4-aminophenyl)fluorene, and 9,9-bis(3-ethyl-5-methyl-4-aminophenyl)fluorene.

Without wishing to bound by theory, it is believed that crosslinking according to the present invention depends on the labile nature of the benzylic hydrogen. The alkyl group bearing the benzylic hydrogen can be branched but is preferably unbranched. The alkyl group may contain 1 to 10 carbon atoms but preferably is C1–C4 and more preferably methyl or ethyl, most preferably methyl.

Preferably the alkyl group bearing the benzylic hydrogen is contained in the diamines comprising the pendent fluorenyl group(s), more preferably being attached to one or both aminoaryl substituents of the diamine comprising the pendent fluorenyl group(s). However, the alkyl group bearing the benzylic hydrogen may alternately be present on a comonomer. If the aromatic ring having the alkyl substituent is present on a comonomer, preferably it is a diamine comonomer such as 2,5-dimethyl(p-phenylenediamine) (DMPDA).

The dianhydride may be any dianhydride suitable for use in forming polyimide polymers. Preferably the dianhydride is aromatic. Aromatic tetracarboxylic acid dianhydride compounds useful in the polyimides of the present invention are those represented by Formula I,

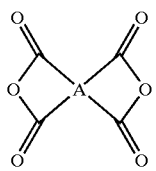

(I)

wherein A preferably contains from 6 to 40 carbon atoms and preferably contains a pyromellitic group, a polycyclic aromatic group such as naphthylene, fluorenylene, benzofluorenylene, anthracenylene, and substituted derivatives thereof, wherein the substituted groups can be alkyl having 1 to 10 carbon atoms and fluorinated derivatives thereof, and halogen such as F or Cl, and moieties of Formula II:

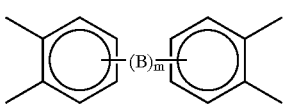

(II)

wherein B can be a covalent bond, a $C(R^2)_2$ group, a OArO group, a CO group, an O atom, an S atom, and $SO_2$ group, a $Si(C_2H_5)_2$ group or an $N(R^3)_2$ group, and combinations thereof, wherein m can be an integer of 1 to 10; each $R^2$ independently can be H or $C(R^4)_3$; each $R^3$ independently can be H, an alkyl group having from 1 to about 20 carbon atoms, or an aryl group having from about 6 to about 20 carbon atoms; Ar can be an aromatic group having from about 6 to about 40 carbon atoms, and each $R^4$ independently can be H, fluorine, or chlorine.

Representative useful dianhydrides include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2'-bis(3,4-dicarboxyphenyl)hexafluoropropane dianhydride (6FDA), bis(3,4-dicarboxyphenyl)ether dianhydride, 4,4'-oxydi(phthalic anhydride), 3,3',4,4'-diphenylsulfonetetracarboxylic acid dianhydride, 4,4'-{4,4'-isopropylidene-di(p-phenyleneoxy)}-bis(phthalic anhydride), N,N-(3,4-dicarboxyphenyl)-N-methylamine dianhydride, bis(3,4-dicarboxyphenyl)diethylsilane dianhydride, naphthalene tetracarboxylic acid dianhydrides such as 2,3,6,7- and 1,2,5,6-naphthalenetetracarboxylic acid dianhydrides, 2,6-dichloronaphthalene-1,4,5,8-tetracarboxylic acid dianhydride, and heterocyclic aromatic tetracarboxylic acid dianhydrides such as thiophene-2,3,4,5-tetracarboxylic acid dianhydride, pyrazine-2,3,5,6-tetracarboxylic acid dianhydride, pyridine-2,3,5,6-tetracarboxylic acid dianhydride, and 2,2 bis[4-(3,4-dicarboxyphenoxy)phenyl]propane dianhydride, also called bisphenol A di(phthalic anhydride) (BPADA).

The polyimide may be made by any suitable method. Suitable methods are described in the Examples below and in C. E. Sroog, *Prog. Polym. Sci.*, 16, pp 561–694 (1991) and U.S. Pat. No. 5,750,641, both of which are incorporated herein by reference.

Prior to crosslinking, the polyimide preferably has a number average molecular weight (Mn) of between 1,000 and 200,000, more preferably between 10,000 and 100,000.

The polyimides of the present invention are not thermoplastic by virtue of the fact that they crosslink when heated to temperatures in excess of their glass transition temperature (Tg).

The polyimides according to the present invention exhibit curing and crosslinking behavior. The terms cure and crosslink are defined above. The polyimides according to the present invention become crosslinked when heated to temperatures approaching or in excess of Tg. However, curing is observed to begin at lower temperatures.

The polyimide may be cured thermally. The uncured polyimide is preferably heated to a temperature sufficient to produce loss of solubility. Preferably the curing temperature is about 200° C. or greater, more preferably about 300° C. or greater, more preferably about 350° C. or greater, and most preferably about 390° C. or greater. Preferably curing is performed under an inert atmosphere such as nitrogen. Preferably curing is accomplished during a heating step of no longer than ten hours, more preferably no longer than one hour, and most preferably no longer than 40 minutes. Preferably the polyimide is processed before curing, e.g. into fibers, particles, or most preferably into a film. Preferably the film is formed by casting the polyimide from solution.

Crosslinking of the polyimide may be accomplished by any suitable method, but preferably by thermal crosslinking. The uncrosslinked polyimide is preferably heated to a temperature equal to or greater than 20° C. below Tg, more preferably a temperature equal to or greater than 10° C. below Tg, and most preferably a temperature equal to or greater than Tg. Preferably the crosslinking curing temperature is about 350° C. or greater, more preferably about 370° C. or greater, more preferably about 390° C. or greater, and most preferably about 400° C. or greater. Preferably crosslinking is performed under an inert atmosphere such as nitrogen. Preferably crosslinking is accomplished during longer than ten hours, more preferably no longer than one hour, and most preferably no longer than 40 minutes. Preferably the polyimide is processed before crosslinking, e.g. into fibers, particles, or most preferably into a film. Preferably the film is formed by casting the polyimide from solution.

The cured polyimide films are preferably insoluble to the extent that stirring in one of methyl ethyl ketone, N-methylpyrrolidone or γ-butyrolactone, produces substantially no dissolution of the polyimide and more preferably no visible dissolution of the polyimide at all, after 15 minutes at 25° C. and preferably even after 1 hour at 250° C.

The crosslinked polyimide films are preferably insoluble even when immersed in N-methylpyrrolidone at 100° C. for a period 2 days.

The resulting cured or crosslinked polyimides may have excellent electrical properties, particularly at microwave frequencies, approximately 1–100 gHz. Preferably the polyimides according to the present invention have a dielectric constant at 12.8 GHz of 3.0 or less, more preferably 2.8 or less, and more preferably 2.6 or less. Preferably dialectic constants are maintained in the desired range even after equilibration to ambient conditions, such as the test conditions described below of 50% humidity at an air temperature of 21° C. Preferably the polyimides according to the present invention have a dielectric loss at 12.8 GHz of 0.012 or less, more preferably 0.011 or less, and more preferably 0.010 or less. Preferably dielectric loss is maintained in the desired range even after equilibration to ambient conditions, such as the test conditions described below of 50% humidity at an air temperature of 21° C.

The cured and crosslinked polyimides according to the present invention preferably demonstrate high mechanical stability, as represented by a low thermal expansion coefficient. The materials according to the present invention preferably have a thermal expansion coefficient at zero applied strain of 60 ppm/° C. or less, more preferably 40 ppm/° C. or less, and most preferably 20 ppm/° C. or less, these coefficients preferably holding true over a temperature range from 25° C. to 100° C., more preferably from 25° C. to 200° C., and most preferably from 25° C. to 260° C.

This invention is useful as a dielectric material, e.g. in electronic devices and electronic packaging.

Objects and advantages of this invention are further illustrated by the following examples, but the particular materials and amounts thereof recited in these examples, as well as other conditions and details, should not be construed to unduly limit this invention.

EXAMPLES

Materials

Unless otherwise noted, all chemicals and reagents were obtained or are available from Aldrich Chemical Co., Milwaukee, Wis.

In the following Examples, 9,9-bis(3-methyl-4-aminophenyl)fluorene (OTBAF) was prepared as described in U.S. Pat. No. 4,684,678, Example 2. It was recrystallized from anhydrous dichloroethane prior to use. p-Phenylenediamine (PDA) was obtained in a sublimed, zone-refined form from Aldrich Chemical Co. (Milwaukee, Wis.). 9,9-bis(4-aminophenyl)fluorene (BAF) was obtained from Shinetsu Chemicals Co., Ltd., Tokyo, Japan. 2,5-Dimethyl(p-phenylenediamine) (DMPDA) was obtained from Aldrich and recrystallized from absolute ethanol prior to use. 3,3'-4,4'-Benzophenone tetracarboxylic acid dianhydride (BTDA) was purchased from Aldrich in a sublimed form. 4,4'-Oxydi(phthalic anhydride) (ODPA) was obtained from Occidental Chemical Corp. (Dallas, Tex.) and purified via recrystallization from anisole. Pyromellitic dianhydride (PMDA), 2,2'-bis-((3,4-dicarboxyphenyl)-hexafluoropropane dianhydride (6FDA) and 3,3'-4,4'-biphenyltetracarboxylic dianhydride (s-BPDA) were purchased and used as received from Chriskev Co. (Leawood, Kan.). 2,2'-bis-((3,4-dicarboxyphenyl)-hexafluoropropane dianhydride (6FDA) was also purchased from Clariant Co., Charlotte, N.C. 2,2 bis[4-(3,4-dicarboxyphenoxy)phenyl] propane dianhydride, also called bisphenol A di(phthalic anhydride) (BPADA) was obtained from General Electric, Mount Vernon, Ind.

Polyimide Synthesis

Polyimides 1–9 and 10C were made using the monomers indicated in Table I. Polyimides designated with a "C" relate to comparative examples. Table II represents the structures of polyimides 1–9 and 10C.

TABLE I

| Polyimide | Diamine(s) (mol %) | Dianhydride(s) (mol %) | Tg, ° C. |
|---|---|---|---|
| 1 | OTBAF (50%) | BTDA (50%) | 385 |
| 2 | OTBAF (25%) DMPDA (25%) | 6FDA (50%) | 382 |

TABLE I-continued
| Polyimide | Diamine(s) (mol %) | Dianhydride(s) (mol %) | Tg, ° C. |
|---|---|---|---|
| 3 | OTBAF (50%) | 6FDA (50%) | 380 |
| 4 | OTBAF (50%) | ODPA (50%) | 380 |
| 5 | OTBAF (50%) | PMDA (15%) 6FDA (35%) | 408 |
| 6 | OTBAF (25%) PDA (25%) | 6FDA (50%) | 378 |
| 7 | OTBAF (50%) | BPADA (50%) | 254 |
| 8 | OTBAF (50%) | BPDA (50%) | 380 |
| 9 | BAF (25%) DMPDA (25%) | 6FDA (50%) | |
| 10C | BAF (50%) | 6FDA (50%) | |
TABLE II
| Polyimide | Structure |
|---|---|
1
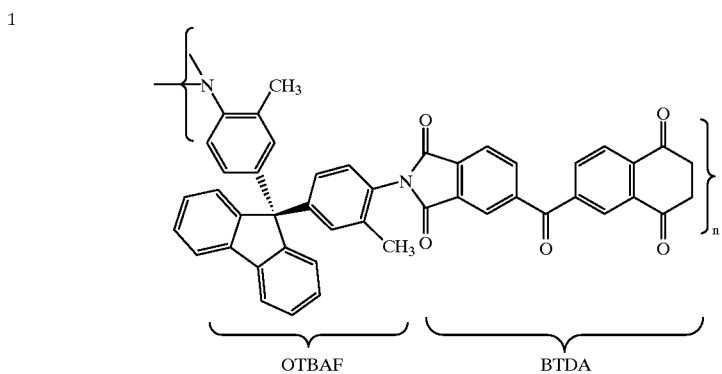
2
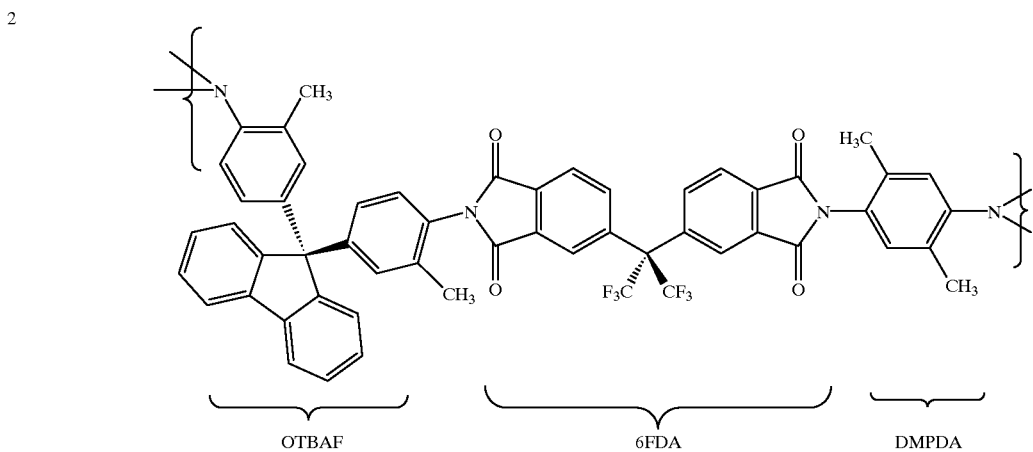

TABLE II-continued
| Polyimide | Structure |
|---|---|
| 3 | 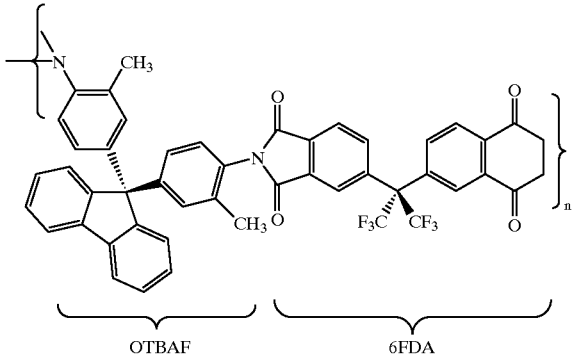 OTBAF, 6FDA |
| 4 | 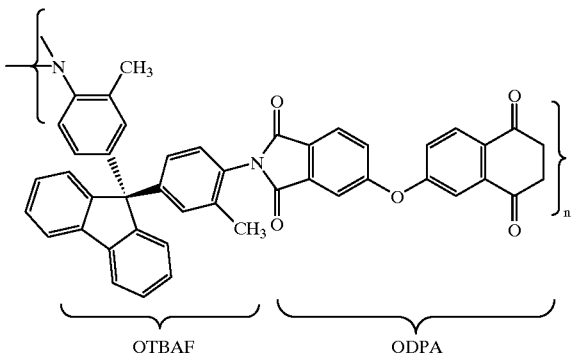 OTBAF, ODPA |
| 5 | 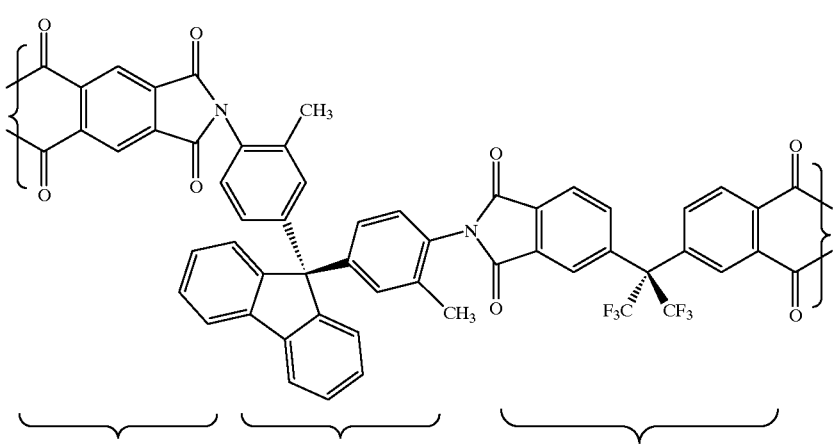 PMDA, OTBAF, 6FDA |

TABLE II-continued

| Polyimide | Structure |
|---|---|
| 6 | OTBAF – 6FDA – PDA |
| 7 | OTBAF – BPADA |
| 8 | OTBAF – BPDA |

TABLE II-continued

| Polyimide | Structure |
|---|---|
| 9 | BAF—6FDA—DMPDA copolymer structure |
| 10C | BAF—6FDA copolymer structure |

The polyimides were synthesized following a modification of information disclosed in C. E. Sroog, *Prog. Polym. Sci.*, 16, pp 561–694 (1991). The syntheses are disclosed in detail below. Additional detail can be found in U.S. Pat. No. 5,750,641, which is incorporated herein by reference.

Polyimides 1–8 were synthesized as follows. About 150 g of the indicated monomers in the indicated ratios were charged as powders directly into a one liter three-neck reaction flask equipped with a mechanical stirrer, nitrogen inlet and bubbler, heating mantle, and temperature controller.

The reactor was sealed and 560 cc N,N-dimethylacetamide (DMAC) was added. Stirring was begun under a steady nitrogen purge. After several hours of stirring at room temperature, a light yellow, viscous poly(amic acid) solution was obtained. After stirring for four hours, acetic anhydride (65.1 g) was added dropwise to the polyamic acid solution, followed by pyridine (44.1 g), also added dropwise. The reaction was heated to 120° C. and held for 45 minutes, then for one hour at 100° C. The resultant cyclized polyimide remained in solution throughout. The solution was cooled to room temperature overnight, and then the crude polyimide was coagulated by slowly pouring the DMAC solution into methanol, in a blender. The precipitated polymer was obtained by filtration onto a large, coarse-fitted Buchner funnel and washed with 8–12 liters (2–3 gallons) of methanol. This extensive washing was necessary to free the material of DMAC, pyridine, and other by-products. The washed polymer was then vacuum-dried at 60° C. overnight; the final product was a white powder. Films of this material were prepared via solvent-coating from a variety of solvents.

Polyimide 9 was synthesized as follows. In a 500 ml three neck flask equipped with an Arlyn™ cooling tube provided with a calcium chloride tube at the upper portion, and a tube for supplying nitrogen dehydrated through the calcium chloride tube, 3.48 g of 9,9-bis(4-aminophenyl)fluorene and 1.39 g of 2,5-dimethyl-1,4-diaminobenzene (DMPDA) were charged, and then dissolved by adding 100 g of N-methylpyrrolidone (NMP) while supplying nitrogen. 8.88 g of 1,1,1,3,3,3-hexafluoropropane-2,2-bis(4-phthalic anhydride) (6FDA) was added to the resulting solution, followed by maintaining at room temperature for one hour and 20 minutes and then heating over a hot water bath at 60° C. for one hour and 20 minutes while stirring using a stirring device. 7.6 ml of acetic anhydride and 6.5 ml of dry pyridine were added, followed by stirring over an oil bath at 120 to 140° C. with heating for another two hours. The resulting solution was air-cooled to room temperature (25° C.) and then added dropwise to 1 L of methanol in a 2 L beaker to obtain a precipitate. The precipitate was washed with deionized water, washed with ethanol on a Buchner funnel, and then dried overnight in an oven at 100° C. to obtain the desired crosslinkable polyimide of this example.

Polyimide 10C was prepared as polyimide 9, except that the starting monomers were 6.97 g BAF, 8.88 g 6FDA and no DMPDA.

The glass transition temperatures (Tg) reported in Table I above were measured as discussed below under the heading Thermomechanical Properties.

Crosslinking

For polyimides 1–8 synthesized above, four grams of polyimide powder were dissolved in 16 g of cyclopentanone to prepare a 20 wt % polyimide solution. The solution was coated on a Kapton™ film (manufactured by Du Pont Co., Wilmington, Del.) using a knife coater having a gap of 300 $\mu$m, and then dried overnight in an oven at 80° C. to obtain a crosslinkable polyimide film having a film thickness of about 40 $\mu$m.

The film was heated in an oven at 400° C. under a nitrogen atmosphere for 30 minutes to obtain the crosslinked polyimide film of this example.

The crosslinked polyimide film was cut into a 2 cm-square sample, which was put in a reagent bottle filled with methyl ethyl ketone (MEK) and stirred for about one hour. The film was not dissolved. Deterioration (e.g., brittleness, etc.) of the film was not observed. Solvent resistance was similarly demonstrated with NMP and γ-butyrolactone. The film was not dissolved with either solvent.

Polyimide 9 was also crosslinked according to a substantially similar procedure and likewise was found to be insoluble in methyl ethyl ketone and γ-butyrolactone. For comparison, a sample of polyimide 9 film (uncrosslinked) was dipped in MEK. The uncrosslinked polyimide sample was dissolved within several minutes.

Polyimide 10C (comparative) was also formed into a film and heated at 400° C. for 30 minutes. However, when immersed in MEK the sample was swollen within several minutes and white turbidity was produced in the MEK demonstrating partial dissolution of the polymer. Additional samples of polyimide 10C film were dipped in γ-butyrolactone and in NMP; each dissolved within about one hour. Thus the omission of the benzyl hydrogen from the polymer structure produced a polyimide that did not crosslink and did not cure, even at 400° C.

Additional Curing Examples

Additional examples were run to examine the temperature dependence of the curing phenomenon.

For each of polyimides 1–7 synthesized above, 40 $\mu$m to 50 $\mu$m thick polyimide films were prepared by dissolving the polymer in a 20 weight percent (wt %) N-methylpyrrolidone (NMP) solution. The solutions were cast on 125 $\mu$m thick Kapton film (available from Du Pont, Wilmington, Del.) using a knife coater with an adjustable gap distance. A gap distance of 270 $\mu$m resulted in a 40 $\mu$m thick cast polyimide (PI) film. The cast polyimide solution was dried. in an oven held at 50° C. overnight (about 16 hours). Samples of polyimide film 10 cm by 10 cm were cut from the dried material. The PI film was then fixed onto a rectangular glass substrate with two clips securing each side. Each PI film sample was cured at 300° C., 350° C., or 400° C. for 30 minutes in a nitrogen atmosphere. This heat curing shrank the samples a small amount.

After curing, 1 cm by 3 cm samples were cut from the cured PI film. The samples were soaked for one hour in 10 cc bottles filled with methyl ethyl ketone (MEK), N-methylpyrrolidone (NMP), or γ-butyrolactone (GBL). After soaking, the samples were removed from the solvent and the film conditions were visually inspected for cracks, then the samples were creased to evaluate brittleness properties. The uncrosslinked parent polymers were also subjected to the same solubility testing. Tables III through VI show the solubility results for these films along with the solubility behavior of the parent polyimide powder with no thermal treatment for comparison. Soluble samples were indicated with the designation "S", gel-forming samples by "G", insoluble samples by "I", and insoluble but brittle film by "I,B".

TABLE III

Parent Polyimide Powder Solubility

| Polyimide | MEK | NMP | GBL |
|---|---|---|---|
| 1 | I | S | S |
| 2 | S | S | S |
| 3 | G | S | S |
| 4 | I | S | S |
| 5 | S | S | S |
| 6 | S | S | S |
| 7 | I | S | S |

TABLE IV

300° C. for 30 min under $N_2$; ~50 $\mu$m free-standing film

| Polyimide | MEK | NMP | GBL |
|---|---|---|---|
| 1 | I | I, B | I, B |
| 2 | S | S | S |
| 3 | S | S | S |
| 4 | I | I, B | I, B |
| 5 | G | S | S |
| 6 | S | S | S |
| 7 | I | I | I |

TABLE V

350° C. for 30 min under $N_2$; ~50 $\mu$m free-standing film

| Polyimide | MEK | NMP | GBL |
|---|---|---|---|
| 1 | I, B | I, B | I, B |
| 2 | S | G | G |
| 3 | S | G | G |
| 4 | I | I, B | I, B |
| 5 | G | I, B | I, B |
| 6 | S | I, B | I, B |
| 7 | I | I | I |

TABLE VI

400° C. for 30 min under $N_2$; ~50 $\mu$m free-standing film

| Polyimide | MEK | NMP | GBL |
|---|---|---|---|
| 1 | I | I, B | I, B |
| 2 | I | I | I |
| 3 | I | I | I |
| 4 | I | I, B | I, B |
| 5 | I | I | I |
| 6 | I | I | I |
| 7 | I | I | I |

Crosslinking on Aluminum Substrate

The above tests were repeated for polyimides 2, 3, and 7, each constrained on aluminum. Sample preparation and testing follows: Aluminum substrate material 100 mm by 100 mm and 2 mm thick was sand blasted using a blast pressure of 0.35 MPa with alumina powder having an average diameter of 0.016 mm. Then the aluminum substrate was chemically etched in a solution of sodium dichromate dihydrate (4 g), sulfuric acid (40 g) and distilled water (120 g). The substrate material was soaked in this solution (maintained at 63 to 67° C.) for 2 hours, rinsed with DI water and dried. A 1 wt % solution of 3-aminopropyltriethoxysilane adhesion promoter (from Shi-netsu Chemicals, Tokyo, Japan) in a base of 90% ethanol and 10% water, was spin-coated onto the aluminum substrate, then dried in air at 120° C. for 30 min.

true crosslinking, cured films were immersed in NMP at 100° C. for a period 2 days and the solubility observed. In Table VIII, "yes" means the sample neither dissolved nor swelled. A "no" means the sample dissolved.

Parent Homopolymer Structure

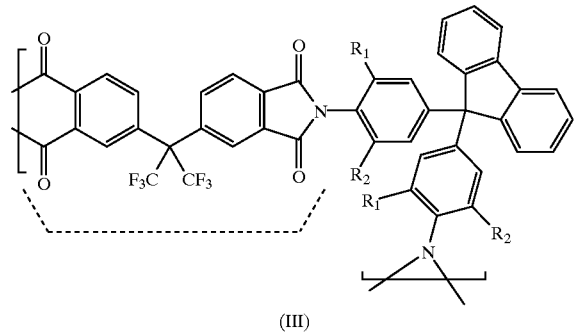

(III)

PDA Comonomer

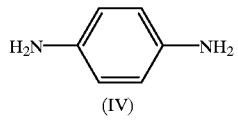

(IV)

The polyimide powders were dissolved in cyclopentanone to yield a 20 wt % solution. The solution of each composition was coated onto the aluminum substrate (prepared as described above) using a knife coater with a 500 μm gap. The polyimide-coated aluminum substrates were dried in a 50° C. oven overnight (about 16 hours) to remove any cyclopentanone. Then the samples were cured using a temperature cycle heating from room temperature to 400° C. over about 30 minutes, holding at 400° C. for 1 hour, then cooling to room temperature over about 60 minutes. A nitrogen atmosphere was maintained in the oven. The resultant film thickness on the aluminum substrate was 80 μm. These samples of polyimide on aluminum were soaked for 2 minutes in each test solvent, to simulate a photoresist stripping process. The results are indicated in Table VII.

TABLE VII

| | Polyimide | | |
|---|---|---|---|
| Solvent | 2 | 3 | 7 |
| methyl isobutyl ketone (MIBK) | I | I | I, B |
| NMP | I | I | I, B |
| g-butyrolactone | I | I | I, B |
| cyclohexanone | I | I | I |
| ethyl acetate | I | I,B | I,B |

Structural Basis of Polyimide Crosslinking

Additional examples were run to examine the structural basis of the curing phenomenon.

Polyimide compositions with structural variations in the fluorenyl diamine residue were studied in order to demonstrate the cause of the crosslinking behavior. The structures are shown in Formula III and Table VIII. Polyimides were formed according to the procedure described above. Comonomer PDA, Formula IV, was added as indicated in Table VIII. Films were prepared by solvent casting, then curing at 390° C. under nitrogen for 20 minutes. As a test for

TABLE VIII

| $R_1$ | $R_2$ | Comonomer | Crosslinked |
|---|---|---|---|
| —CH$_2$CH$_3$ | —CH$_2$CH$_3$ | none | yes |
| —CH$_3$ | —H | none | yes |
| —CH$_3$ | —CH$_2$CH$_3$ | none | yes |
| —H | —H | none | no |
| —H | —H | PDA | no |

This example suggests that true crosslinking occurs with cure at 390° C. and that the feature that enables the crosslinking process is the alkylaromatic group. Where no alkyl substituent was present the material did not crosslink. Addition of a comonomer without an alkylaromatic group did not affect this trend. However, polyimide 9, above, demonstrated that addition of a comonomer with an alkylaromatic group did result in crosslinking.

Materials Properties

The following examples demonstrate that the cured polyimides have properties useful for numerous application areas, including electronics and optoelectronics.

Dielectric constant (1 MHz)

The out-of-plane dielectric constant (k) of polyimides 2–8 was determined by parallel plate capacitance measurements (metal-polyimide-metal). The dielectric constant was calculated with the following relation $$k=(c \times t)/(\epsilon \times A)$$

where c=measured capacitance, t=film thickness, ε=permittivity of vacuum, and A=area of aluminum dot. Metal-polyimide-metal samples were prepared by spin coating polyimide films (1 to 2 μm thick with less than about 1% thickness variation per sample) on aluminized silicon wafers. The films were heat treated under nitrogen under one of two conditions: at 300° C. for 2.5 hrs. or at 400° C. for 0.5 hrs. Then, aluminum dots (0.750 mm radius) were electron beam vacuum-deposited onto the free surface of the polyimide. Since moisture absorption in films was known to increase the overall dielectric constant of a film ($k_{water}$=78.2 at 1 MHz), both the dielectric constant of "dry" films (dried at 240° C. in nitrogen for 3 hours prior to measurement) and those equilibrated in the ambient laboratory environment (21° C., 50% relative humidity) were measured. The dielectric measurements of the polyimide films in the dried state exhibited dielectric constants ranging from 2.73 to 3.05 at 1 MHz, as reported in Table IX. The change in dielectric constant with crosslinking was small, as was the change in dielectric constant with crosslinking temperature. Upon equilibration in the ambient laboratory environment the dielectric constant increased, as expected, due to the absorption of a small amount of moisture in the film (less than about 1 wt % moisture absorption was calculated from the change in dielectric constant).

TABLE IX

Dielectric Constant at 1 MHz

| Polyimide | Dry film (300° C., 2.5 hrs.) | Equilibrated to ambient (300° C., 2.5 hrs.) | Dry film (400° C., 0.5 hrs.) | Equilibrated to ambient (400° C., 0.5 hrs.) |
|---|---|---|---|---|
| 2 | 2.78 | 3.10 | 2.89 | |
| 3 | 2.82 | 3.14 | 2.87 | 3.16 |
| 5 | 2.73 | 2.98 | 2.74 | 3.12 |
| 6 | 2.77 | 3.08 | 3.04 | |
| 7 | 2.96 | 3.08 | 3.05 | |
| 8 | 2.94 | 3.50 | 3.00 | 3.59 |

Dielectric Constant/loss (12.8 GHz)

The in-plane dielectric properties at 12.8 GHz of polyimides 2–8 were measured by the split post resonator technique (as described in Baker-Jarvis, et al., *IEEE Trans. on Dielectric and Electrical Insulation*, 5(4), 1998, p. 571, and Krupka, et al., *Proc. 7th International Conference on Dielectric Materials: Measurements and Applications*, IEEE Conference Publication No. 430, Sept. 1996).

Polyimide films 38 to 102 μm (1.5 to 4 mils) thick were cast from solution (NMP) with a doctor blade and were allowed to dry over a period of several days in nitrogen at room temperature. The films were subsequently heat treated overnight at 200° C. in vacuum followed by a second heat treatment under nitrogen atmosphere under one of three sets of conditions: 230° C. for 3.5 hours, 340° C. for 3 hours, or 400° C. for 0.5 hours. As with the 1 MHz dielectric measurements, the dielectric constant of "dried" films (dried at 230° C. in nitrogen for 3 hours and cooled to room temperature overnight in nitrogen prior to measurement) and those equilibrated in the ambient laboratory environment (21° C., 50% RH) were measured. The dielectric constant and dielectric loss of water at 10 GHz are 55.0 and 540 milliunits respectively. Tables X and XI report the measured dielectric constants.

TABLE X

Dielectric Loss (milliunits) at 12.8 GHz

| | 230° C., 3.5 hrs | | 340° C., 3 hrs | | 400° C., 30 min | |
|---|---|---|---|---|---|---|
| Polyimide | "dry" film | Equilibrated to ambient | "dry" film | Equilibrated to ambient | "dry" film | Equilibrated to ambient |
| 2 | 2.26 | 11.92 | 6.62 | 11.93 | 7.14 | 10.38 |
| 3 | 2.64 | 7.75 | 3.07 | 5.11 | | |

TABLE X-continued

Dielectric Loss (milliunits) at 12.8 GHz

| | 230° C., 3.5 hrs | | 340° C., 3 hrs | | 400° C., 30 min | |
|---|---|---|---|---|---|---|
| Polyimide | "dry" film | Equilibrated to ambient | "dry" film | Equilibrated to ambient | "dry" film | Equilibrated to ambient |
| 4 | 6.82 | 9.55 | | | | |
| 5 | 3.14 | 13.43 | | | | |
| 6 | 2.71 | 10.44 | | | | |
| 7 | 2.59 | 6.29 | | | | |
| 8 | 4.91 | 9.41 | | | | |

TABLE XI

Dielectric Constant at 12.8 GHz

| | 230° C., 3.5 hrs | | 340° C., 3 hrs | | 400° C., 30 min | |
|---|---|---|---|---|---|---|
| Polyimide | "dry" film | Equilibrated to ambient | "dry" film | Equilibrated to ambient | "dry" film | Equilibrated to ambient |
| 2 | 2.64 | 2.75 | 2.66 | 2.74 | 2.67 | 2.76 |
| 3 | 2.65 | 2.71 | 2.68 | 2.71 | | |
| 4 | 2.88 | 2.98 | | | | |
| 5 | 2.77 | 2.96 | | | | |
| 6 | 2.66 | 2.82 | | | | |
| 7 | 2.84 | 2.92 | | | | |
| 8 | 2.86 | 2.97 | | | | |

The data in Tables X and XI indicate that the materials of the present invention have excellent characteristics for use in electronic components or packaging materials for devices that operate in the gigahertz frequency range. It is notable that the dielectric constant was relatively stable throughout the crosslinking process for polyimide 2.

Refractive Index/birefringence

In-plane ($n_{TE}$) and out-of-plane ($n_{TM}$) refractive index measurements of the polyimide films were made with a Model 2010 prism coupler (632.8 nm polarized laser light source)(Metricon Corp., Pennington, N.J.). The prism coupler was also used to determine film thickness. Measured values of $n_{TE}$ and $n_{TM}$ were used to calculate in-plane dielectric constant at 632.8 nm ($n_{TE}2$), out-of-plane dielectric constant at 632.8 nm ($n_{TM}2$), and birefringence ($n=n_{TE}-n_{TM}$). The polyimide films used for measurement were made by spin coating onto silicon wafers from NMP solvent. Films were made ranging in thickness from 1 to 2 μm. Across a given sample, the film thickness varied by less that 2%.

Table XII lists the in-plane ($n_{TE}$) and out-of-plane ($n_{TM}$) refractive index, the calculated birefringence ($n_{TE}-n_{TM}$) and the calculated dielectric constants ($n^2$) at 632.8 nm for films of various compositions following curing at 400° C. for 30 minutes under nitrogen.

TABLE XII

Refractive Index and Calculated Birefringence and Dielectric Constants

| Polyimide | $n_{TE}$ | $n_{TM}$ | ($n_{TE} - n_{TM}$) | $n_{TE}^2$ | $n_{TM}^2$ |
|---|---|---|---|---|---|
| 2 | 1.5743 | 1.5532 | 0.0211 | 2.4784 | 2.4124 |
| 3 | 1.5853 | 1.5795 | 0.0058 | 2.5131 | 2.4948 |
| 5 | 1.6008 | 1.5748 | 0.0260 | 2.5625 | 2.4800 |
| 6 | 1.5844 | 1.5720 | 0.0124 | 2.5103 | 2.4712 |
| 7 | 1.6412 | 1.6384 | 0.0028 | 2.6935 | 2.6844 |
| 8 | 1.6622 | 1.6480 | 0.0142 | 2.7629 | 2.7159 |

A low degree of birefringence (i.e., film anisotropy) is desirable for many electronic applications where isotropic dielectric properties are desired in the passivation of circuitry. Refractive index measurements indicate that the polyimide films have a relatively small amount of out-of-plane birefringence. Crosslinking according to the present invention further reduced out-of-plane birefringence. These results are shown in Table XIII below and in FIG. 1 for a single polyimide film sample (polyimide 2) cured at progressively higher temperatures under nitrogen atmosphere. At each temperature interval, the film was heated for an additional period of 30 minutes in nitrogen. It is notable that the refractive index and therefore the dielectric constant was relatively stable throughout the curing process. This indicated that the cure process did not degrade the dielectric properties of the film, an important attribute for electronics packaging, dielectric insulator, and other applications.

TABLE XIII

| Temp (° C.) | $\eta$ (in-plane) | $\eta$ (out-of-plane) | $\eta^2$ (in-plane) | $\eta^2$ (out-of-plane) | $\Delta\eta^2$ (in-out) |
|---|---|---|---|---|---|
| 419 | 1.5681 | 1.5615 | 2.4589 | 2.4383 | 0.0206 |
| 408 | 1.5684 | 1.5607 | 2.4599 | 2.4358 | 0.0241 |
| 400 | 1.5686 | 1.5596 | 2.4605 | 2.4323 | 0.0282 |
| 390 | 1.5688 | 1.5591 | 2.4611 | 2.4308 | 0.0303 |
| 380 | 1.5688 | 1.559 | 2.4611 | 2.4305 | 0.0306 |
| 370 | 1.569 | 1.5592 | 2.4618 | 2.4311 | 0.0307 |
| 175 | 1.5699 | 1.5474 | 2.4646 | 2.3944 | 0.0702 |

Optical Transmission

Materials demonstrating low loss at optical wavelengths are often required for optical applications.

Figure 2:
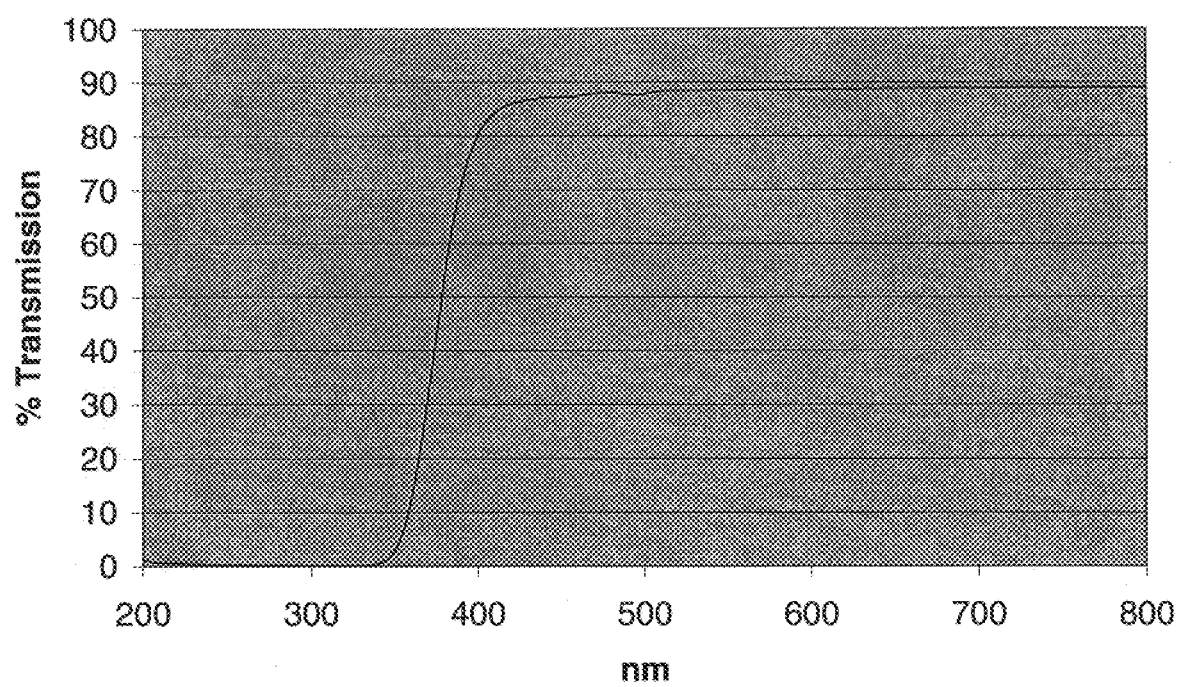
FIG. 2 is an optical transmission spectrum from 200 nm to 800 nm wavelength of a comparative uncured film of polyimide.
Figure 3:
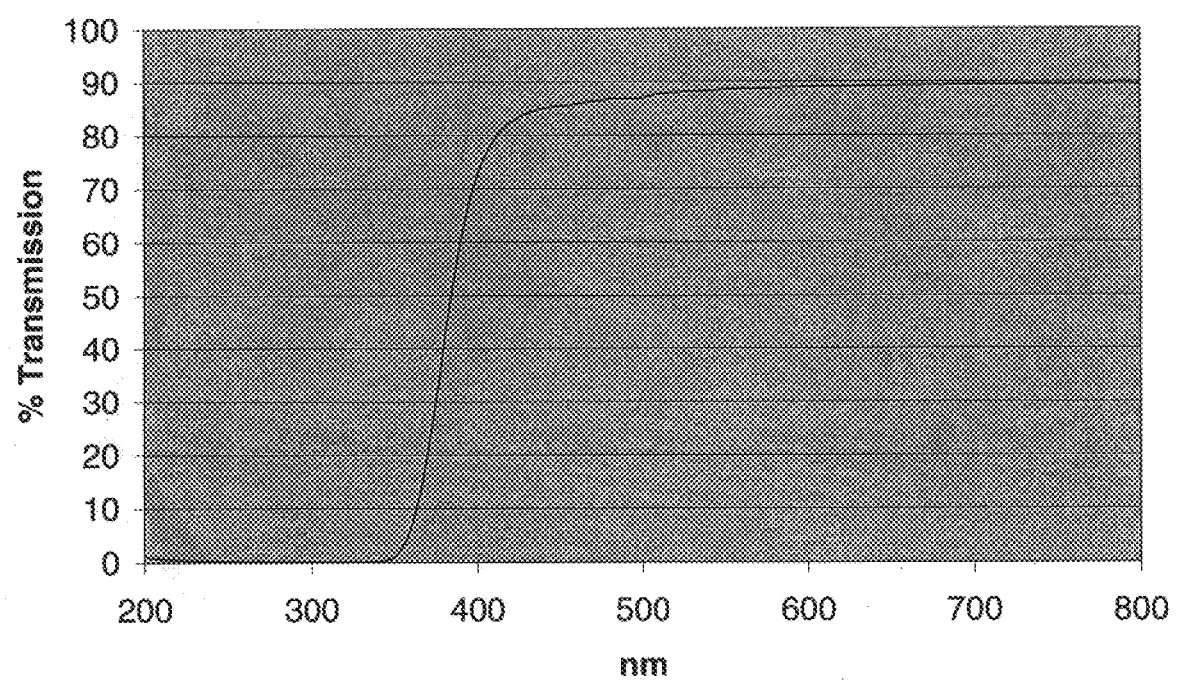
FIG. 3 is an optical transmission spectrum form 200 nm to 800 nm wavelength of a cured film of polyimide according to the present invention.
Figure 4:
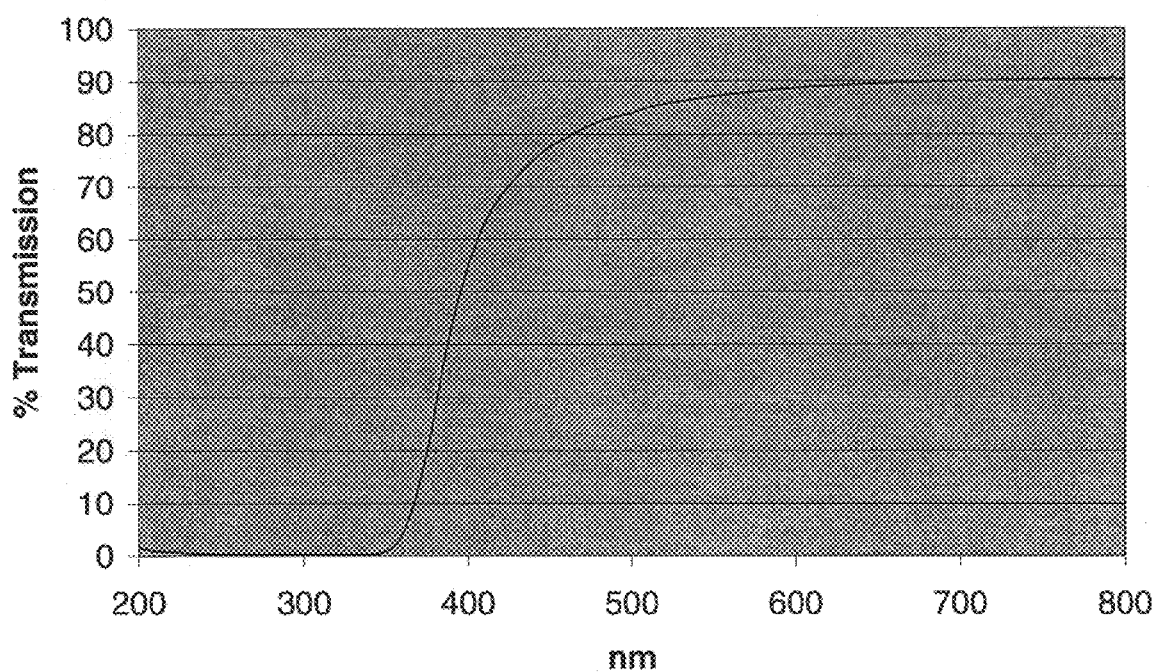
FIG. 4 is an optical transmission spectrum form 200 nm to 800 nm wavelength of a crosslinked film of polyimide according to the present invention.

Optical transmission spectra were measured for polyimides in uncured, cured, and crosslinked states using a UV/VIS/NIR Spectrometer Lambda 19 (Perkin-Elmer Analytical Inst. Co., Norwalk, Conn.). Films were cast from NMP to thicknesses of about 30–50 μm. Actual thickness was measured manually using calipers before curing and is reported in Table XIV. Comparative uncured films were allowed to dry at room temperature under nitrogen for several days. Cured films were heated to 260° C under nitrogen for one hour. Crosslinked films were heated to 400° C. under nitrogen for 30 minutes. Films were shown to have excellent transmission above a measured cutoff point. FIGS. 2, 3 and 4 are transmission spectra obtained for polyimide 3 in uncured, cured, and crosslinked states, respectively. Table XIV lists the wavelength in nanometers at which 85% transmission was obtained for each polyimide.

TABLE XIV

| Polyimide | Uncured | Cured | Crosslinked | Thickness (μm) |
|---|---|---|---|---|
| 1 | 478 | 600 | 744 | 46 |
| 2 | 401 | 483 | 580 | 37 |
| 3 | 412 | 440 | 510 | 51 |
| 4 | 411 | 484 | 609 | 44 |
| 5 | 447 | 465 | 624 | 35 |
| 6 | 420 | 447 | 697 | 29 |
| 7 | 422 | 465 | 584 | 30 |
| 8 | 432 | 483 | 549 | 52 |

The materials according to the present invention demonstrate good optical transmission characteristics for use in telecommunication applications such as waveguides, even after crosslinking.

Thermomechanical Properties

The lateral thermal expansion coefficient of a cured film of polyimide 2 was obtained by thermomechanical analysis using a TMA 2940 Thermomechanical Analyzer (TA Instruments, Inc). The films were cured at 380° C. in nitrogen for 30 minutes. The initial dimensions of the measured films were 12.8 mm by 2 mm with a thickness of 0.030 mm. After the films were loaded into the instrument, the films were first placed under low stress (0.5 MPa) and heated to 300° C. for 30 minutes under nitrogen. 300° C. was chosen as a temperature sufficiently below Tg so that no permanent stretching or increase in molecular orientation would occur during this pretreatment. This pretreatment step is intended to relieve internal film stress, such as stresses that cause curling and the like. The actual measurements were then made under nitrogen at a scan rate of 10° C./minute. Dimensional change increases rapidly at the glass transition temperature (Tg) of the polymer, and therefore this method was also used to determine all of the Tg data reported in Table I. Measurements were made at four different applied stress levels: 1.6, 2.4, 3.1 and 4.0 MPa. These results were then extrapolated to zero applied strain. For polymer 2 cured as indicated above, the thermal expansion coefficient at zero applied strain was calculated to be 19.8 ppm/° C. over a temperature range from 25° C. to 260° C.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A cured polyimide comprising a diamine comprising a pendent fluorenyl group, said cured polyimide also comprising an aromatic ring having at least one C1–C10 branched or unbranched alkyl substituent, wherein said alkyl substituent includes a benzylic hydrogen.

2. The cured polyimide according to claim 1 wherein said alkyl substituent is selected from the group consisting of methyl and ethyl.

3. The cured polyimide according to claim 1 wherein said alkyl substituent is methyl.

4. The cured polyimide according to claim 1 wherein said diamine is an alkyl substituted 9,9-bis(aminophenyl) fluorene.

5. The cured polyimide according to claim 1 wherein said diamine is a 9,9-bis(toluidinyl)fluorene.

6. The cured polyimide according to claim 1 wherein said diamine does not contain ether or carboxyl-containing linkages.

7. The cured polyimide according to claim 1 additionally comprising an aromatic dianhydride.

8. The cured polyimide according to claim 1 which is insoluble in N-methylpyrrolidone (NMP) after one hour at 25° C.

9. The cured polyimide according to claim 1 having a thermal expansion coefficient at zero applied strain of less than 60 ppm/° C. over a temperature range from 25° C. to 260° C.

10. The cured polyimide according to claim 1 having a thermal expansion coefficient at zero applied strain of less than 20 ppm/° C. over a temperature range from 25° C. to 260° C.

11. An electronic device comprising the cured polyimide according to claim 1.

12. An antenna comprising the cured polyimide according to claim 1.

13. An optical device comprising the cured polyimide according to claim 1.

14. An optical waveguide comprising the cured polyimide according to claim 1.

15. A crosslinked polyimide comprising a diamine comprising a pendent fluorenyl group, said crosslinked polyimide also comprising an aromatic ring having at least one C1–C10 branched or unbranched alkyl substituent, wherein said alkyl substituent includes a benzylic hydrogen.

16. The crosslinked polyimide according to claim 15 wherein said alkyl substituent is selected from the group consisting of methyl and ethyl.

17. The crosslinked polyimide according to claim 15 wherein said alkyl substituent is methyl.

18. The crosslinked polyimide according to claim 15 wherein said diamine is an alkyl substituted 9,9-bis(aminophenyl)fluorene.

19. The crosslinked polyimide according to claim 15 wherein said diamine is a 9,9-bis(toluidinyl)fluorene.

20. The crosslinked polyimide according to claim 15 wherein said diamine does not contain ether or carboxyl-containing linkages.

21. The crosslinked polyimide according to claim 15 additionally comprising an aromatic dianhydride.

22. The crosslinked polyimide according to claim 15 wherein said crosslinking is due to thermal crosslinking.

23. The crosslinked polyimide according to claim 15 which is insoluble in methyl ethyl ketone after one hour at 25° C.

24. The crosslinked polyimide according to claim 15 which is insoluble in NMP after two days at 100° C.

25. The crosslinked polyimide according to claim 15 which is not thermoplastic.

26. The crosslinked polyimide according to claim 15 having a thermal expansion coefficient at zero applied strain of less than 60 ppm/° C. over a temperature range from 25° C. to 260° C.

27. The crosslinked polyimide according to claim 15 having a thermal expansion coefficient at zero applied strain of less than 20 ppm/° C. over a temperature range from 25° C. to 260° C.

28. An electronic device comprising the crosslinked polyimide according to claim 15.

29. An antenna comprising the crosslinked polyimide according to claim 15.

30. An optical device comprising the crosslinked polyimide according to claim 15.

31. An optical waveguide comprising the crosslinked polyimide according to claim 15.

32. A cured polyimide made by a process comprising the step of heating to a temperature of at least 200° C. a polyimide comprising a diamine comprising a pendent fluorenyl group, said polyimide also comprising an aromatic ring having at least one C1–C10 branched or unbranched alkyl substituent, wherein said alkyl substituent includes a benzylic hydrogen.

33. The cured polyimide according to claim 32 wherein said temperature is at least 250° C.

34. The cured polyimide according to claim 32 wherein said temperature is at least 300° C.

35. The cured polyimide according to claim 32 wherein said temperature is at least 350° C.

36. The cured polyimide according to claim 32 wherein said alkyl substituent is selected from the group consisting of methyl and ethyl.

37. The cured polyimide according to claim 32 wherein said alkyl substituent is methyl.

38. The cured polyimide according to claim 32 wherein said diamine is an alkyl substituted 9,9-bis(aminophenyl)fluorene.

39. The cured polyimide according to claim 32 wherein said diamine is a 9,9-bis(toluidinyl)fluorene.

40. The cured polyimide according to claim 32 additionally comprising an aromatic dianhydride.

41. The cured polyimide according to claim 32 wherein said diamine does not contain ether or carboxyl-containing linkages.

42. The cured polyimide according to claim 32 which is insoluble in N-methylpyrrolidone (NMP) after one hour at 25° C.

43. The cured polyimide according to claim 32 having a thermal expansion coefficient at zero applied strain of less than 60 ppm/° C. over a temperature range from 25° C. to 260° C.

44. The cured polyimide according to claim 32 having a thermal expansion coefficient at zero applied strain of less than 20 ppm/° C. over a temperature range from 25° C. to 260° C.

45. An electronic device comprising the cured polyimide according to claim 32.

46. An antenna comprising the cured polyimide according to claim 32.

47. An optical device comprising the cured polyimide according to claim 32.

48. An optical waveguide comprising the cured polyimide according to claim 32.

49. A crosslinked polyimide made by a process comprising the step of crosslinking a polyimide comprising a diamine comprising a pendent fluorenyl group, said polyimide also comprising an aromatic ring having at least one C1–C10 branched or unbranched alkyl substituent, wherein said alkyl substituent includes a benzylic hydrogen.

50. The crosslinked polyimide according to claim 49 wherein said step of crosslinking comprises thermal crosslinking.

51. The crosslinked polyimide according to claim 50 wherein said step of thermal crosslinking comprises the step of raising the temperature of said polyimide to a temperature greater than the glass transition temperature of said polyimide.

52. The crosslinked polyimide according to claim 51 wherein said step of thermal crosslinking is substantially complete in one hour or less.

53. The crosslinked polyimide according to claim 49 wherein said alkyl substituent is selected from the group consisting of methyl and ethyl.

54. The crosslinked polyimide according to claim 49 wherein said alkyl substituent is methyl.

55. The crosslinked polyimide according to claim 49 wherein said diamine is an alkyl substituted 9,9-bis(aminophenyl)fluorene.

56. The crosslinked polyimide according to claim 49 wherein said diamine is a 9,9-bis(toluidinyl)fluorene.

57. The crosslinked polyimide according to claim 49 additionally comprising an aromatic dianhydride.

58. The crosslinked polyimide according to claim 49 wherein said diamine does not contain ether or carboxyl-containing linkages.

59. The crosslinked polyimide according to claim 49 which is insoluble in methyl ethyl ketone after one hour at 25° C.

60. The crosslinked polyimide according to claim 49 which is insoluble in NMP after two days at 100° C.

61. The crosslinked polyimide according to claim 49 which is not thermoplastic.

62. The crosslinked polyimide according to claim 49 having a thermal expansion coefficient at zero applied strain of less than 60 ppm/° C. over a temperature range from 25° C. to 260° C.

63. The crosslinked polyimide according to claim 49 having a thermal expansion coefficient at zero applied strain of less than 20 ppm/° C. over a temperature range from 25° C. to 260° C.

64. An electronic device comprising the crosslinked polyimide according to claim 49.

65. An antenna comprising the crosslinked polyimide according to claim 49.

66. An optical device comprising the crosslinked polyimide according to claim 49.

67. An optical waveguide comprising the crosslinked polyimide according to claim 49.

* * * * *

UNITED STATES PATENT AND TRADEMARK OFFICE
CERTIFICATE OF CORRECTION

PATENT NO.    : 6,417,321 B1
DATED         : July 9, 2002
INVENTOR(S)   : Minami, Kazuhiko It is certified that error appears in the above-identified patent and that said Letters Patent is hereby corrected as shown below:

Column 1,
Lines 42 and 61, "subtitutent" should be -- substituent --.

Column 2,
Line 19, "insolublility" should be -- insolubility --.
Line 56, "is graph" should be -- is a graph --.
Lines 62 and 65, "form" should be -- from --.

Column 3,
Line 44, "to bound" should be -- to be bound --.

Column 5,
Lines 42-43, "during longer" should be -- during a heating step of no longer --.
Line 54, "250°" should be -- 25° --.
Line 57, "period 2" should be -- period of 2 --.
Line 63, "dialectic" should be -- dielectric --.

Column 10,
Polyimide #5, in the formula after "}" add -- n -- as a subscript.
Polyimide #6, in the formula after "}" add -- n -- as a subscript.
Polyimide #8, should read --

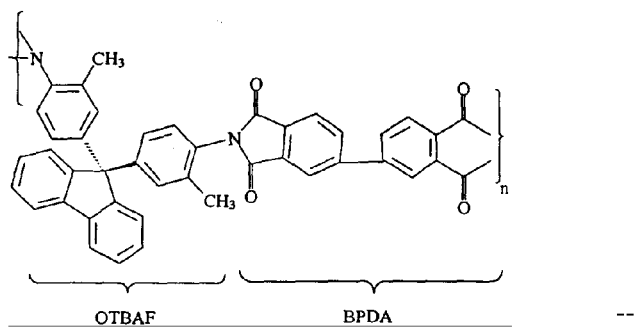

--

Column 15,
Line 50, "dried. in" should be -- dried in --.

UNITED STATES PATENT AND TRADEMARK OFFICE
CERTIFICATE OF CORRECTION

PATENT NO.     : 6,417,321 B1
DATED          : July 9, 2002
INVENTOR(S)    : Minami, Kazuhiko It is certified that error appears in the above-identified patent and that said Letters Patent is hereby corrected as shown below:

Column 18,
Line 2, "period 2" should be -- period of 2 --.

Column 20,
Line 47, "less that" should be -- less than --.

Signed and Sealed this

Twenty-fourth Day of August, 2004

JON W. DUDAS
*Director of the United States Patent and Trademark Office*